Figure 1:
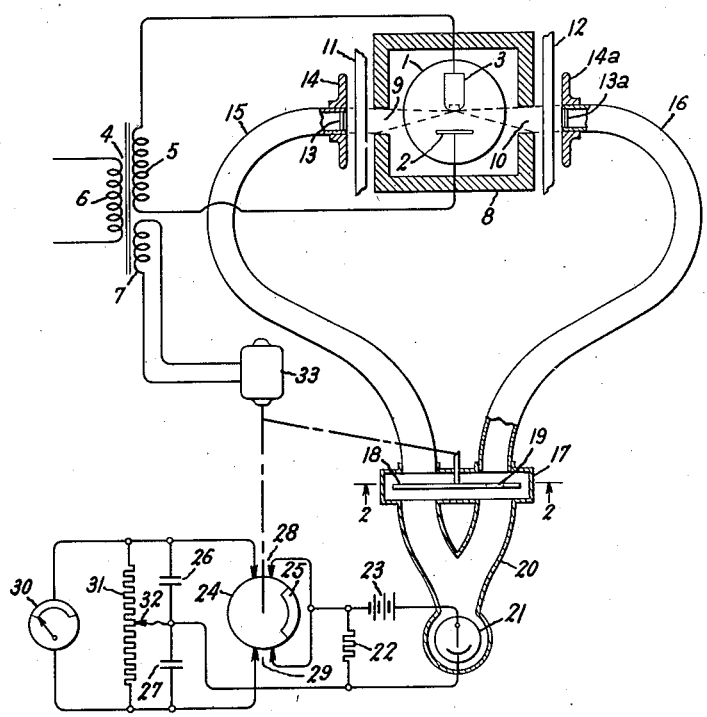

April 4, 1950   C. D. MORIARTY   2,503,062
X-RAY ABSORPTION PHOTOMETER
Filed Nov. 14, 1946

Inventor:
Charles D. Moriarty,
by Prowell S. Mack
His Attorney.

Patented Apr. 4, 1950

2,503,062

UNITED STATES PATENT OFFICE 2,503,062

X-RAY ABSORPTION PHOTOMETER

Charles D. Moriarty, Schenectady, N. Y., assignor to General Electric Company, a corporation of New York Application November 14, 1946, Serial No. 709,739

2 Claims. (Cl. 250—95)

My invention relates to X-ray absorption photometers and more particularly to X-ray absorption photometers of the absorption comparison type.

It is known that any substance, regardless of its physical state, gaseous, liquid or solid, will absorb X-rays to an extent dependent upon the atomic numbers of the elements constituting that substance and upon the quantity of each of these elements through which the X-rays must pass. Therefore, much may be learned about a substance by comparing its absorption to the absorption of X-rays by a known specimen preferably consisting of elements all of which have the same known atomic weight.

However, absorption phenomena are also dependent upon the wavelength of the X-ray being absorbed. Long wavelength or "soft" X-rays are absorbed to a greater extent by any substance than are the short wavelength or "hard" X-rays. Furthermore, the change in degree of absorption with respect to change in wavelength cannot be easily expressed since all elements display the so-called K, L, and M band absorption phenomena which may be briefly described as discontinuities caused by the atomic structure of the element under consideration. Therefore, it would be desirable when comparing the absorptions of two substances to use a monochromatic beam of X-rays, that is, a beam consisting of rays all of which have the same wavelength, selected so that this does not coincide with the K, L, or M discontinuities.

For a fixed D.-C. value of anode-to-cathode voltage, X-ray tubes of the general type emit X-rays consisting of rays of many different wavelengths whose intensities are unequal. It is usual practice to consider this unequal intensity band spectra beam in terms of a monochromatic beam of proper intensity and wavelength which produces the same absorption characteristics as the actual beam. Practice also shows that the wavelength and intensity of such an equivalent beam changes if the anode voltage of the X-ray tube is altered only slightly since the intensity band spectra pattern is dependent upon the voltage applied to the tube. It is, therefore, necessary to use the same anode voltage or an identical sequence of anode voltages when comparing the absorptions of two different substances by any non-simultaneous method of comparison.

Various means for measuring absorption of X-rays in an unknown specimen are known to those skilled in the art. Means for comparing the absorption of X-rays by an unknown specimen to that by a known or standard specimen, with such X-rays supplied by a common source, are also known. Such a technique, however, requires accurate measurement of the unabsorbed X-rays passing through each specimen. In the past, separate X-ray measuring devices have been utilized for such measurements, and the desired information has been obtained by comparison and interpretation of the separate measured results.

Since, as is known in the art, a greater absorption contrast is possible when the intensity of the unabsorbed X-rays is made low by utilizing X-rays of as long a wavelength as practicable, it is necessary to utilize sensitive measuring devices. Such sensitive devices however, are particularly subject to changes in calibration, and calibrations thereof are not easily accomplished. Therefore, errors of a considerable magnitude may be introduced by a change in calibration of either, or both, of such measuring devices. It is, therefore, highly desirable to employ a device wherein the unabsorbed X-rays from each specimen may be measured in a single and common measuring device designed to produce a resultant dependent upon the degree of inequality of absorption through the specimens being analyzed. In using such comparison methods by a single measuring device, a change or error in calibration has no effect upon the accuracy of results obtained.

It is an object of my invention to provide improved means for analyzing substances by X-ray absorption comparison methods wherein errors caused by changes in the source of X-rays are minimized.

It is another object of my invention to utilize a single means for measuring the absorption of both substances, thereby eliminating inaccuracies otherwise introduced by unequal changes in sensitivity characteristics of separate measuring means as may be caused by changes in circuit elements, such as phototubes, thermionic tubes, resistances, and the like.

Another object of my invention is to provide a device wherein sensitive measuring apparatus and the observer thereof are not subjected to the injurious effects of X-rays passing through the objects being analyzed.

The features of the invention which are believed to be novel and patentable will be pointed out in the claims appended hereto. For a better understanding of the invention, reference is made in the following description to the accompanying drawing in which Fig. 1 discloses a preferred embodiment of my invention whereby absorption of X-rays in two noncoincident paths may be compared and measured by a single indicating device; and Fig. 2 is a view of a shutter disk taken on the line 2—2 of Fig. 1.

Figure 2:
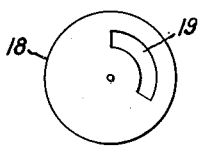

Referring to Fig. 1, an X-ray tube 1, possessing a cathode 2 and an anode 3, may be energized by connection across a secondary coil 5 of a transformer 4. Transformer 4 also possesses a primary coil 6 which may be energized from an A.-C. source and a third winding 7 which is utilized for purposes to be described.

A suitable X-ray shield 8 of conventional type is provided with openings 9 and 10, through which X-ray beams of essentially equal cross section and intensity may be transmitted. Preferably, the two openings are 180 degrees apart, so that the operator and instruments can be located out of line with either X-ray beam. The X-ray beam passing through opening 9 is intercepted by a specimen 11 to be analyzed. Absorption of the X-ray within specimen 11 occurs to an extent dependent upon the thickness and X-ray characteristics of such specimen. The unabsorbed X-rays impinge upon a fluorescent screen 13 coated with material of such type that X-rays will cause it to become illuminated. The X-ray beam passing through opening 10 is similarly intercepted by a standard specimen 12 of known characteristics and thickness, and the unabsorbed rays impinge upon a fluorescent screen 13a. Unabsorbed X-rays or secondary radiation X-rays around screens 13 and 13a may be totally interrupted by absorbing shields 14 and 14a. Thus complete protection from X-radiations is obtained for the operator and the instruments.

The resulting illumination at screens 13 and 13a is transmitted to a common point by the light-tight system consisting of light tunnels 15 and 16 and casings 17 and 20. Light tunnels 15 and 16 are preferably glass tubes, bent to the desired configuration, silvered on the outside surface in any suitable fashion and covered by an opaque material. For maximum light transmission efficiency and minimum light absorption by the glass walls, it is evident that the glass walls of the light tunnels should be as thin as possible. For example, $\frac{1}{16}$ inch has been found to be a practicable thickness.

Within an essentially cylindrical casing 17, a rotatable disk 18 possessing an opening 19, more clearly described in connection with Fig. 2, is rotatably mounted. Light tunnels 15 and 16 enter one side of casing 17 through openings on opposite sides of the axis of rotation of disk 18.

The other side of casing 17 is provided with openings alined with an opposite to the openings accommodating light tunnels 15 and 16. A casing or chamber 20, of suitable configuration and silvered and opaqued on the outside surface, is joined to casing 17 at the openings therein. A phototube 21, preferably of the multiplier type, is placed within chamber 20 in such position that light passing through tunnel 15 or through tunnel 16 will affect phototube 21 in the same manner.

Phototube 21 may be energized by any conventional source such as represented by a resistor 22 in series with a source of direct current voltage such as battery 23. It may be preferable to utilize conventional amplifying means in connection with a multiplier phototube in order to obtain a sufficient electrical indication of the light intensities impinging upon phototube 21. Such means are known in the art and do not constitute a part of my invention. The voltage existing across resistor 22 when light strikes phototube 21 is utilized to charge a condenser 26 during the interval when a commutator segment 25 on a commutator 24 bridges the contacts at 28. Similarly, condenser 27 is charged to a value dependent upon the voltage across resistor 22 when commutator segment 25 bridges the contacts at 29. Any other equivalent commutating arrangement may be utilized without departing from the scope of my invention.

Since condensers 26 and 27 must necessarily have a common junction connected to one side of resistor 22, they are connected in series opposition in such fashion that the voltage across the two in series is equal to the difference in voltages upon condensers 26 and 27, respectively. A meter 30, connected across the two condensers in series, may be utilized to indicate such difference in voltage. A discharge path for each condenser is provided by placing a resistor 31 across the two condensers in series, upon which an adjustable tap 32 is provided which may be connected to the junction between the two condensers. A synchronous motor 33, energized from winding 7 of transformer 4, is employed to rotate shutter disk 18 and commutator 24.

An X-ray tube when energized from an A.-C. source emits X-rays during the positive half cycle only of each cycle of the impressed A.-C. voltage. Thus, the illumination at screens 13 and 13a occurs during each positive half cycle only. Shutter disk 18 is mounted on a shaft driven by motor 33 in such fashion that slit 19 of disk 18 allows light from screen 13 to strike phototube 21 during one positive half cycle and alternate positive half cycles thereafter, and allows light from screen 13a to strike phototube 21 during the next positive half cycle and alternate positive half cycles thereafter. Commutator 24 is similarly mounted on a shaft driven by motor 33, so that condenser 26 is charged during the interval that phototube 21 is subjected to light from screen 13, and condenser 27 is similarly charged during the time phototube 21 is subjected to light from screen 13a.

Referring to Fig. 2, the opening 19 in disk 18 is more clearly shown. The size of opening 19 is not critical and may be made any desired amount as long as light rays from screens 13 and 13a do not strike the phototube 21 simultaneously.

Operation of the device disclosed in Fig. 1 may be further explained as follows: When transformer 4 is energized from any conventional A.-C. source, such as a sixty-cycle source, X-ray tube 1 will emit X-rays during each half cycle when anode 3 becomes positive with respect to cathode 2. During such emission, two X-ray beams of essentially equal cross section and intensity pass through openings 9 and 10, respectively, in shield 8. One X-ray beam passes into the specimen 11 to be analyzed and is absorbed therein to a degree dependent upon its X-ray characteristics and thickness. The unabsorbed X-rays passing through specimen 11 strike screen 13 which becomes fluorescent to an extent dependent upon the intensity of the X-rays impinging upon it. Similarly, the other X-ray beam passes into the standard specimen 12 and is absorbed therein to an extent dependent upon its known characteristics. The unabsorbed rays transmitted through specimen 12 cause screen 13a to fluoresce. Since the characteristics and thickness of specimen 12 are known, the fluorescense at screen 13a is essentially a measure of the X-ray beam intensity being produced by X-ray tube 1. Therefore, by continuously comparing the illumination intensities at screens 13 and 13a errors caused by X-ray anode voltage changes are minimized.

Illumination intensities at screens 13 and 13a may be compared by subjecting a phototube 21 to each intensity alternately, thereby obtaining an electrical result which is utilized in a manner to be described. A light path from screen 13 to phototube 21 is provided by a casing 20 which encloses phototube 21, and a light tunnel 15. Similarly, a light path is provided from screen 13a to phototube 21 by casing 20 and light tunnel 16. It has been found that thin-walled glass tubing silvered on the outside and covered by an opaque material transmits light at high efficiency if the radius of curvature of any desired bend is sufficiently large to prevent any reflection back toward the transmitting end. Transmission efficiencies of 60 to 90 per cent are attainable using this method—much higher than the efficiencies attainable using a conventional lens and mirror optical system. If the two light paths from screens 13 and 13a, respectively, to phototube 21 are similar or symmetrical, their transmission efficiencies will be essentially equal.

A shutter disk 18 with an opening 19 therein is so interposed in the two light paths that one path is completely blocked during the time the second path allows transmission of light. Thus, phototube 21 is at any instant subjected to illumination of only one screen. If the shutter disk is rotated synchronously with respect to the source voltage applied to X-ray tube 1 and its phase relationship thereto properly adjusted, phototube 21 will be affected by light emanating from screen 13 during one positive half cycle of the alternating current voltage and subjected to light from screen 13a during the next succeeding positive half cycle of the alternating current voltage source. If a sixty-cycle alternating current source is utilized, disk 18 is driven at 1800 R. P. M. as by four-pole synchronous motor 33.

In the circuit shown, resistor 22 will have a voltage across it each time phototube 21 is illuminated. Thus, during one positive half cycle of the A.-C. source a voltage dependent upon the illumination at screen 13 will exist across resistor 22. Similarly, a voltage dependent upon the illumination at screen 13a will exist across resistor 22 during the next succeeding positive half cycle. In operation, a series of such voltage pulses will appear across resistor 22, in which alternate voltage pulses will depend upon the illumination from the same screen.

If a condenser is charged to an average value dependent upon the magnitude of the alternate pulses of such a series of pulses, and a second condenser is charged to an average value dependent upon the magnitude of the remaining pulses in such a series, the difference in voltage across such condensers is a measure of the relative illumination at screens 13 and 13a, respectively. This selective charging of two condensers may be accomplished by utilizing a commutator 24, possessing a commutator segment 25, driven at the same speed or in synchronism with shutter disk 17. Thus, condenser 26 may be connected across resistor 22 during the time phototube 21 is illuminated by screens 13, and condenser 27 similarly connected during the time phototube 21 is illuminated by screen 13a. Since the polarities of condensers 26 and 27 are made identical at their common connection, the voltage existing across the two condensers in series is their difference voltage. Thus, meter 30 across the condensers in series will indicate this difference voltage. To enable the charge on each condenser to follow the variations of voltage across resistor 22, a discharge path for each is provided through resistance 31 and adjustable tap 32. Tap 32 may be adjusted to a point where the discharge time or R. C. constant of each condenser is essentially the same. Presence of such a discharge path causes an A. C. component of voltage to be present in the difference voltage but it has no effect upon a normally damped D. C. type instrument 30.

It may be desirable to check the calibration of the device by exchanging screens 13 and 13a and noting if such change causes any difference in the deflection of meter 30. If such meter change occurs, it is apparent that screens 13 and 13a are not equally sensitive to X-ray radiations. By such exchange, a calibration or correction factor may be determined and used during interpretation of results or tap 32 may be adjusted to counteract any small inherent unbalance. However, I have found that screens 13 and 13a may be made to have little, if any, detectable difference in their response. It may be advisable also to exchange specimens 11 and 12 if there is any possibility X-ray tube 1 is not placed symmetrically within shield 8 with respect to openings 9 and 10.

It is apparent that considerable advantage exists in using a single measuring device and associated circuit while making comparison studies, since the measuring device need not be calibrated nor does a shift in its characteristics introduce errors in the indicated values. The proposed device also possesses a less obvious advantage in that the unabsorbed X-rays passing through specimens 11 and 12 do not strike any portion of the measuring equipment, nor do they have any injurious effect upon the human observer thereof. It has been found that a phototube directly exposed to X-ray radiation is eventually injured thereby, and this disadvantage has been eliminated by my proposed construction.

As will occur to those skilled in the art, various different arrangements and combinations of the principles described above may be employed without departing from the true spirit and scope of the invention and I, therefore, do not wish to limit my invention to the particular arrangement described.

What I claim as new and desire to secure by Letters Patent of the United States is:

1. In an X-ray absorption comparison photometer and X-ray tube adapted to be energized from an alternating current source for producing X-rays during a portion of each cycle of such source, an X-ray shield around said tube having ports for the emission of two X-ray beams in opposite directions, a first fluorescent screen responsive to X-rays positioned to intercept one of said X-ray beams, a second fluorescent screen responsive to X-rays positioned to intercept the second of said X-ray beams, said first and second fluorescent screens being separated from said X-ray shield sufficiently to allow interception of said X-ray beams by X-ray absorbing specimens, a phototube, curved light tunnels extending from respective fluorescent screens to the phototube, said light tunnels being tubes having walls which reflect light inside the tube and thereby efficiently transmit light through the tubes, a shutter to admit to the phototube light from said first fluorescent screen during a series of alternate cycles of the X-ray tube alternating current source and from said second fluorescent screen during the remaining series of alternate cycles of such source, said light tunnels permitting said phototube to be positioned outside the zones of influence of said X-ray beams, and means responsive to said phototube for indicating the difference in effect upon said phototube by said first and said second illumination producing means.

2. In an X-ray absorption comparison photometer, an X-ray tube adapted to be energized from an alternating current source for producing X-rays during a portion of each cycle of such source, an X-ray shield around said tube having ports for the emission of two X-ray beams in different directions, a first fluorescent screen responsive to X-rays positioned to intercept one of said X-ray beams, a second fluorescent screen responsive to X-rays positioned to intercept the second of said X-ray beams, said first and second fluorescent screens being separated from said X-ray shield sufficiently to allow interception of said X-ray beams by X-ray absorbing specimens, a phototube, curved light tunnels extending from respective fluorescent screens to the phototube, said light tunnels being tubes having walls which reflect light inside the tube and thereby efficiently transmit light through the tubes, a shutter to admit to the phototube light from said first fluorescent screen during a series of alternate cycles of the X-ray tube alternating current source and from said second fluorescent screen during the remaining series of alternate cycles of such source, a first and a second condenser, switching means operating in synchronism with said shutter to subject said first condenser to a voltage dependent upon the illumination upon said phototube from said first illumination producing means and to subject said second condenser to a voltage dependent upon the illumination upon said phototube from said second illumination producing means, and a measuring device for indicating the difference between the voltages across said first and said second condensers.

CHARLES D. MORIARTY.

REFERENCES CITED

The following references are of record in the file of this patent:

UNITED STATES PATENTS

| Number | Name | Date |
|---|---|---|
| 247,229 | Wheeler | Sept. 20, 1881 |
| 1,246,340 | Smit | Nov. 13, 1917 |
| 1,642,187 | Young, Jr. | Sept. 13, 1927 |
| 1,840,500 | Geffcken et al. | Jan. 12, 1932 |
| 1,996,233 | Darrah | Apr. 2, 1935 |
| 1,999,023 | Sharp et al. | Apr. 23, 1935 |
| 2,065,758 | Shepard, Jr. | Dec. 29, 1936 |
| 2,094,318 | Failla | Sept. 28, 1937 |
| 2,196,166 | Bryce | Apr. 2, 1940 |
| 2,264,725 | Shoupp et al. | Dec. 2, 1941 |

FOREIGN PATENTS

| Number | Country | Date |
|---|---|---|
| 293,240 | Germany | Sept. 25, 1915 |